United States Patent [19]

Nevins et al.

[11] Patent Number: 4,571,410

[45] Date of Patent: Feb. 18, 1986

[54] CAULKING COMPOSITION

[75] Inventors: Norman Nevins; Thomas L. Gustafson, both of Dayton, Ohio

[73] Assignee: Magic Seal Corporation, Dayton, Ohio

[21] Appl. No.: 699,177

[22] Filed: Feb. 7, 1985

[51] Int. Cl.⁴ .................... C08L 23/08; C08K 5/34; C08K 3/36
[52] U.S. Cl. .................... 523/122; 523/216; 524/100; 524/464; 524/476; 524/524; 525/222
[58] Field of Search ............ 524/100, 524, 464, 476; 525/222; 523/122, 216

[56] References Cited

U.S. PATENT DOCUMENTS

| | | | |
|---|---|---|---|
| 3,896,069 | 7/1975 | Kosaka et al. | 525/222 |
| 3,914,489 | 10/1975 | Smedberg | 525/222 |
| 3,926,878 | 12/1975 | Shimizu et al. | 525/222 |
| 4,012,547 | 3/1977 | Smedberg | 525/222 |
| 4,063,011 | 12/1977 | Campbell et al. | 524/487 |
| 4,169,822 | 10/1979 | Kutch et al. | 525/108 |
| 4,204,986 | 5/1980 | Romey et al. | 264/160 |
| 4,309,332 | 1/1982 | Fischer et al. | 525/222 |
| 4,338,227 | 7/1982 | Ballard | 525/222 |
| 4,358,557 | 11/1982 | Boggs | 525/222 |
| 4,379,190 | 4/1983 | Schenck | 525/222 |
| 4,382,999 | 5/1983 | Harima et al. | 428/494 |

Primary Examiner—Herbert J. Lilling
Attorney, Agent, or Firm—Killworth, Gottman, Hagan & Schaeff

[57] ABSTRACT

A solvent-based, clear caulking composition having as a primary polymer an ethylene vinyl acetate copolymer having a 45-55% vinyl acetate content and having as a secondary polymer and a small amount of an ethylene vinyl acetate copolymer having a lower vinyl acetate content. Other ingredients in the improved caulking composition include a water white styrenic hydrocarbon resin, thickening agents, and an organic solvent. Optional components include plasticizers, bactericides, antioxidants, U.V. light stabilizers, pigments and dyes, etc. The resulting caulk has excellent pumpability, slump control, and weatherability.

20 Claims, No Drawings

CAULKING COMPOSITION

BACKGROUND OF THE INVENTION

The present invention relates to sealer compositions and more particularly it relates to a solvent-based, clear caulking composition having improved caulking characteristics.

Many types of adhesives, sealants, caulking compositions and the like have been developed heretofore and are discussed at length in the book entitled Sealants by Adolfos Damusis published in 1967 by Reinhold Publishing Company. Many of these compounds are solvent-based ones. See also the *Handbook of Adhesives* (2nd ed.) chapter entitled "Caulks and Sealants", pages 708–709 wherein the "best" of the solvent based sealants, namely silicones, are discussed. However, as pointed out, even silicone sealants have certain drawbacks. Silicone sealants are translucent/opaque rather than clear, they must be protected from moisture during manufacture and storage, and many silicone sealants on cure either evolve acetic acid (which is corrosive and has an objectionable odor) or they must be specially compounded to avoid that problem.

In addition, solvent-based sealants during gradual release of the solvent undergo a shrinkage of the material and/or sagging of the material (termed "slump" in the trade) prior to its having set-up. This is objectionable in many situations.

For that reason Kutch et al, among others, suggest use of hot melt sealants instead. Thus, in U.S. Pat. No. 4,169,822, Kutch et al disclose solvent-free hot melt caulking compositions which are sufficiently soft of fluid at a temperature above about 150° F. to permit them to be readily applied in use and which harden upon cooling without solvent release. The caulking compositions of Kutch et al contain elastomeric polymers such as butyl rubbers, tackifying resins such as terpene resins, and adhesion promoters which may include ethylene vinyl acetate copolymers. See also U.S. Pat. Nos. 3,991,025; 3,988,276, and 3,932,341 for other references to ethylene vinyl acetate containing hot melt caulking compositions.

Even though hot melt caulking compositions avoid for the most part the problems of slump control, other problems exist. For example, hot melt adhesives must, as mentioned, be applied "hot" (i.e. see the Kutch et al requirement that the hot melt adhesives be applied at temperatures between 150°–375° F.) This requires that special heated applicator equipment be readily available. Other disadvantages to hot melt caulking compositions are potential degradation of the caulk and other problems causing because of its temperature dependence. Because hot melt caulking compositions are organic in nature and are applied at elevated temperatures there is the potential for discoloring, viscosity increases, and skinning since such ingredients may be subject to change in their molten state. Likewise, because the materials must of necessity be temperature dependant care must be taken to ensure proper wetting and subsequent adhesion at all use temperatures.

Accordingly, a solvent-based caulking composition would be desirable if the slump problems could be controlled. The need, therefore, exists for an improved solvent-based caulking composition.

SUMMARY OF THE INVENTION

The present invention meets that need by providing a solvent-based, clear caulking composition containing a blend of highly weather resistant copolymers, resins, and plasticizers so as to provide excellent indoor and outdoor caulking performance. The caulking composition applies easily, i.e. it applies "string free" and is easily tooled. The caulking composition can be applied under varying weather conditions including high humidity, moderately cold and warm conditions. It also adheres well to a variety of building materials, has little slump so as to be essentially non-sagging, and it becomes tack-free quickly so that dirt pick-up is eliminated. It is paintable.

The caulking composition of the present invention preferably has the following approximate weight percentages:

50–60% solvent,
12–37% ethylene vinyl acetate copolymer having a 45–55% vinyl acetate content,
0.6–7.4% ethylene vinyl acetate copolymer having a 20–45% vinyl acetate content,
8–16% water white hydrocarbon resin,
4–6% thickening agent,
0–2.4% plasticizer,
0–2.5% bactericide, and
0–0.25% antioxidant/U.V. light stabilizer The solvent may be any one of a number of hydrocarbons which rapidly evaporate at operating temperature and impart quick skinning characteristics to the caulking composition. Preferably it is a blend of chlorinated hdyrocarbons, mineral spirits and toluol. The preferred chlorinated hydrocarbon is an inhibited grade, non-flammable one which inhibits corrosion of the metal parts of any mixing equipment and which contributes to the quick skimming characteristics of the caulk. The mineral spirits may be typical high-flash hydrocarbons having a low (less then 7%) aromatic content. The toluol, on the other hand, is an aromatic solvent which also contributes to quick skinning and hastens the solubilization of the polymers.

The preferred solvent blend of chlorinated hydrocarbons, mineral spirits and toluol insures good solubilization of the polymers, good drying characteristics, and a flash point above 100° F. Also, this blend maintains good clarity as the solvent evaporates.

The primary polymer of the system is the ethylene vinyl acetate copolymer having a 45–55%, and most preferably a 51%, vinyl acetate content. A 51% vinyl acetate, 49% polyethylene copolymer provides good pumpability of temperature as low as 42° F. If the vinyl acetate content is much below 45%, pumpability at low temperatures (below 60° F.) is difficult. At vinyl acetate contents much above 55%, compatibility problems occur.

The secondary polymer present is preferably a small amount (0.6–1.6%) of an ethylene vinyl acetate copolymer having approximately a 20% vinyl acetate content. At that vinyl acetate content level, this copolymer has a two-fold purpose in the system. First, it provides good skinning characteristics. Second, it imparts improved slump control since it is less soluble at ambient temperatures. Since it is is used in fairly small amounts, the low vinyl acetate content does not adversely affect low-temperature pumpability. However, the secondary polymer may also be an ethylene vinyl acetate having a vinyl acetate content nearer that of the primary polymer, but still lower so that the proper balance is achieved. In that case a large amount (2.4–7.4%) would be used to obtain the same result. For example, an 80/20 blend of primary polymer, as described, and an ethylenic vinyl acetate copolymer having around a 40–45% vinyl acetate content may be used.

The preferred water white hydrocarbon resin is an alpha-methyl styrene based one produced by polymerization of pure feed stocks and hydrogenation to a 33 percent level. It is highly stable, has a low molecular weight, and is a non-polar resin having good U.V. light stability.

The thickening agent may be any number of known fillers which are clear, thicken and aid in slump control. The preferred thickening agent is a fumed silica having a refractive index compatible with the other ingredients so as to maintain the clarity of the caulking composition. Most preferably, a glycol is added to couple with the fumed silica and provide a good gel structure which helps prevent slumps on vertical surfaces.

A plasticizer may be added, as needed, to enhance low temperature flexibility, improve wetting and adhesion, enable increased solids content, etc. all known plasticizer functions. Preferred amongst the plasticizers are the benzoic acid derivatives such as glycol and polyglycol mon-, di- and tri-benzoates. Other plasticizers which may be used include dioctyl sebacate, butyl benzyl phthalate, tri(2-ethylhexyl) trimellitate, dibutoxyethyl adipate, and di-2-ethyl-hexyl azelate.

Other optional ingredients are: (1) a bactericide such as a clear antimicrobial agent which will provide long-term protection against bacterial and fungal attack and helps prevent surface growth, staining, embrittlement, and premature product failure; (2) an antioxidant such as a phenol or polyphenol to help prevent premature degradation of the copolymers, resin and plasticizer during processing and after application, and (3), a U.V. light stabilizer such as a benzotrizole or substituted benzotriazole. The antioxidant and U.V. light stabilizer are preferably combined to provide maximum weathering retention properties.

In addition to these preferred optional ingredients, others may be used under certain circumstances. For example, if it is desirable to tint the caulking composition, an appropriate pigment or dye (i.e. one having good U.V. light stability) may be added. Likewise, a silane adhesion promoter may be added if wet application or application to glass is likely. Yet others will readily occur to one of ordinary skill in the art.

The result is a caulking composition that is: clear, non-stringy (easy to apply); non-slump (making it applicable to vertical surfaces); good skinning such that it will not collect dirt and become discolored; adherent to building surfaces such as wood, metal and glass; flexible down to −20° F.; mildew resistant; paintable; inexpensive; weatherable; resealing; and applicable in layers. It may be used in any number of sealing situations, including: sealing around doors and windows; sealing around air conditioning units; sealing around flashings; sealing around patio doors and enclosures; sealing aluminum siding joints; weatherproofing gutters; sealing eaves and vents; as a bathroom caulk for sealing around sinks, tubs, and shower stalls; and sealing boats (and other marine structures), trailers, mobile homes, and other metal structures.

Accordingly, it is an object of the present invention to an improved, solvent-based, clear caulking composition. Other objects and advantages of the invention will be apparent from the following description and the appended claims.

DETAILED DESCRIPTION OF THE PREFERRED EMBODIMENTS

As mentioned, the primary polymer of the present caulking composition is an ethylene vinyl acetate copolymer having a 45–55% vinyl acetate content. Since this is the primary polymer, in discussing the most preferred embodiment it is convenient to set forth the composition in parts by weight with the primary polymer being fixed at 100 parts and the remaining components varying relative thereto. Thus, the preferred caulking composition in approximate parts by weight is:

100 parts ethylene vinyl acetate copolymer having a 45–55% vinyl acetate content,
2.5–35 parts ethylene vinyl acetate copolymer having a 20–45% vinyl acetate content,
35–65 parts water white hydrocarbon resin,
17–25 parts thickening agent
0–10.0 parts plasticizer,
0–10 parts bactericide,
0–2.0 parts antioxidant/U.V. light stabilizer, and
200–250 parts solvent.

An important aspect of the present invention is the combination of the two copolymers listed above. Use alone of the ethylene vinyl acetate copolymer having the 45–55% vinyl acetate content results in a caulking composition that has only marginal slump resistance. The addition of a secondary polymer of ethylene vinyl acetate copolymer having a lower vinyl acetate (i.e. from 20–45%) content improves slump resistance without detracting from pumpability. Thus, use of a single ethylene vinyl acetate having a vinyl acetate content below about 45% (as might be assumed possible since the addition of a lower vinyl acetate level on might be considered simply a lowering of the average overall vinyl acetate content of the combined system), improves slump resistance but the pumpability of the caulking composition below 60° F. is unacceptable. Only the proposed combination provides optimum pumpability at relatively low temperatures and yet maintains excellent slump control.

The relative amount of secondary polymer to primary polymer is also important but depends on the vinyl acetate level of that polymer. At over 25 parts of a high (i.e. around 45%) vinyl acetate content secondary polymer or 6.5 parts of a low (i.e. around 20%) vinyl acetate content secondary polymer to each 100 parts of the primary polymer, pump viscosity is excessively high and the caulking composition is not useable as a practical matter. At less than 2.5 parts of a low vinyl acetate content secondary polymer or around 18 parts of high vinyl acetate content secondary polymer, to each 100 parts of primary polymer, the improvements in slump are negligible.

The preferred primary polymer is Vynathene EY 904-00 from U.S. Industrial Chemicals, Cincinnati, Ohio. Alternatively Vynathene EY 904-25, from the same source, may be used. Both Vynathene EY 904-00 and Vynathene EY 904-25 have approximately a 51% vinyl acetate content. The preferred secondary polymer is Ultrathene UE 645-00, also from U.S. Industrial Chemicals, which has approximately a 20% vinyl acetate content. Alternatively, Vynathene EY 903-00, having approximately a 45% vinyl acetate content.

The preferred water white hydrocarbon resin is Regalrez 3102 from Hercules, Inc. Its range of inclusion is somewhat less critical than the primary polymer/secondary polymer ratio. Preferably it is present in the range of 35-65 parts/100 parts of primary polymer, and most preferably about 50 parts are added. Addition of over about 75 parts renders the caulking composition milky white and detracts from its clarity and, thus, is to be avoided if a clear caulk is being sought.

The amount of thickening agent used may vary depending on the viscosity sought and the amount of solvent present. Generally, it has been found that 17-25 parts is a practical range. It has also been found that a filler prepared from the combination of a fumed silica, such as Cab-O-Sil M5 from Cabot Corporation, and a glycol, such as Pluronic L61 from BASF Wyandotte, is particularly advantageous. The fumed silica is added in the range of 16-22 parts. The glycol is then added at 4-8% of the level of fumed silica or approximately 0.65-1.6 parts per 100 parts of primary polymer. This combination results in formation of a filler gel structure which is particularly advantageous in preventing slumps on vertical surfaces and otherwise gives optimum performance for the caulk.

Likewise, the preferred amount of plasticizer for optimum performance is 5-10 parts for each 100 parts of primary polymer if a plasticizer is used at all. Most preferred around 7 parts of a benzoic acid derivative plasticizer such as Benzoflex 284 from Velsicol Chemical Corp. of Chicago, Ill. Other glycol or polyglycol mono-, di-, or tri-benzoates may be used.

The preferred amount of bactericide present is 0.5-10.0 parts, with the lower levels being most preferred as long as it is sufficient to add the desired amount, if any, of antimicrobial activity. Preferred is a plasticizer compatible antimicrobial agent such as Vinyzene BP5-2MS from Ventron Div. of Morton Thiokol, Inc. Danvers, Mass.

The preferred combined amount of antioxidant/U.V. light absorber is 0.25-1 parts, with the most preferred being about 0.25 parts of a polyphenol antioxidant such as Irganox 1010 from Ciba-Geigy Corp. and about 0.25 parts of a benzotriazole U.V. light stabilizer such as Tinuvin P, also from Ciba-Geigy. Irganox 1010 is tetrakis(methylene 3-(3',5'-di-tert-butyl-4'-hydroxyhydrohydroxycinnamate)methane) and Tinyvin P is 2(2'hydroxy-5'methylphenyl)-benzotriazole. Other nonstaining, non-discoloring, lower water solubility antioxidants and U.V. light stabilizers may be used.

Finally, the solvent may be present preferably in the 200-250 parts range. This can be adjusted depending on the viscosity of the caulk. As mentioned, the preferred solvent is a blend of chlorinated hydrocarbon such as Perchloroethylene SVG from Diamond Shamrock Chemical Company, mineral spirits such as Rule 66 mineral spirits from Getty Oil Company and toluol which may be obtained from Sun Chemical Company, amongst others.

The following non-limiting examples are illustrative of the most preferred caulking composition:

EXAMPLE 1

The ingredients in the pound amounts listed were blended in the following order of addition:

|  | Lbs/Batch | % | Parts |
| --- | --- | --- | --- |
| Chlorinated Hydrocarbon (Perchloroethylene SVG) | 1455.0 | 33.12 | 139.0 |
| Mineral Spirits, Rule 66 | 596.0 | 13.56 | 54.0 |
| Toluol | 382.0 | 8.69 | 36.0 |
| Water White Hydrocarbon Resin (Regalrez 3102) | 550.0 | 12.52 | 52.0 |
| Irganox 1010 Antioxidant | 2.75 | 0.06 | 0.25 |
| Tinuvin P U.V. Light Stabilizer | 2.75 | 0.06 | 0.25 |
| Vinyzene BP5-2MS Bactericide | 5.50 | 0.12 | 0.50 |
| Vynathene EY 904-00 (EVA) | 1050.0 | 23.90 | 100.0 |
| Ultrathene UE 645-00 (EVA) | 50.0 | 1.14 | 4.75 |
| Plasticizer (Benzoflex 284) | 73.0 | 1.66 | 7.0 |
| Cab-O-Sil M5 (fumed silica) | 210.0 | 4.78 | 20.0 |
| Pluronic L61 (glycol) | 17.0 | 0.39 | 1.60 |
|  | 4,394.00 | 100.00 | 415.35 |

EXAMPLE 2

|  | Lbs/Batch | % | Parts |
| --- | --- | --- | --- |
| Chlorinated Hydrocarbon (Perchloroethylene SVG) | 1455.0 | 33.50 | 171.2 |
| Mineral Spirits, Rule 66 | 596.0 | 13.72 | 70.1 |
| Toluol | 382.0 | 8.80 | 44.9 |
| Water White Hydrocarbon Resin (Regalrez 3102) | 550.0 | 12.66 | 64.7 |
| Irganox 1010 Antioxidant | 2.75 | 0.06 | 0.32 |
| Tinuvin P U.V. Light Stabilizer | 2.75 | 0.06 | 0.32 |
| Vinyzene BP5-2MS Bactericide | 5.50 | 0.12 | 0.65 |
| Vynathene EY 904-00 (EVA) | 850.0 | 19.57 | 100.0 |
| Vynathene EY 903-00 (EVA) | 250.0 | 4.60 | 23.5 |
| Benzoflex 284, Plasticizer | 73.0 | 1.68 | 8.60 |
| Cab-O-Sil M5 fumed silica | 210.0 | 4.83 | 24.70 |
| Pluronic L61 glycol | 17.0 | 0.39 | 1.60 |
|  | 4,344.00 | 100.00 | 510.99 |

The resulting clear caulking composition was tested for its caulking characteristics and it was found to have excellent pumpability even at lower temperatures; excellent slump control; good skinning characteristics; and excellent weatherability.

While the composition described herein constitutes a preferred embodiment of the invention, it is to be understood that the invention is not limited to this precise composition and that changes may be made therein without departing from the scope of the invention, which is defined in the appended claims.

What is claimed is:

1. A solvent based, clear caulking composition comprising by weight approximately:
   50-60% solvent,
   12-37% of a first ethylene vinyl acetate copolymer having a 45-55% vinyl acetate content,
   0.6-7.4% of a second ethylene vinyl acetate copolymer having a 20-45% vinyl acetate content,
   8-16% water white hydrocarbon resin,
   4-6% thickening agent,
   0-2.4% plasticizer,
   0-2.5% bactericide, and
   0-0.25% antioxidant/U.V. light stabilizer.

2. The solvent-based, clear caulking composition of claim 1 wherein said thickening agent is a combination of a fumed silica which has a refractive index compatible with the other ingredients so as to maintain the clarity of said caulking composition, and a glycol which couples with said fumed silica to provide a good gel structure.

3. The solvent-based, clear caulking composition of claim 2 wherein said solvent is a blend of chlorinated hydrocarbons, mineral spirits, and toluol.

4. The solvent-based, clear caulking composition of claim 3 wherein said plasticizer is a benzoic acid derivative.

5. The solvent-based, clear caulking composition of claim 3 wherein said antioxidant/U.V. light stabilizer is a combination of an antioxidant selected from the group consisting of phenols and polyphenols and a benzotriazole U.V. light stabilizer.

6. The solvent-based, clear caulking composition of claim 5 wherein said antioxidant is tetrakismethylene(3′,5′-di-tert-butyl-4′-hydroxyhydrocinnamate)methane and said U.V. light stabilizer is 2(2′hydroxy-5′-methylphenyl)benzotriazole.

7. The solvent-based, clear caulking composition of claim 5 wherein said water white hydrocarbon resin is an alpha-methyl styrene based one.

8. The solvent-based, clear caulking composition of claim 7 consisting essentially of:
   55% solvent,
   24% of a first vinyl acetate copolymer having a 51% vinyl acetate content,
   13% water white hydrocarbon resin,
   5% thickening agent,
   2% plasticizer,
   1% of a second ethylene vinyl acetate copolymer having approximately a 20% vinyl acetate content,
   0.06% antioxidant,
   0.06% U.V. light stabilizer, and
   0.1% bactericide.

9. The solvent-based, clear caulking composition of claim 7 consisting essentially of:
   56% solvent
   20% of a first ethylene vinyl acetate copolymer having a 51% vinyl acetate content,
   13% water white hydrocarbon resin
   5% thickening agent,
   2% plasticizer,
   5% of a second ethylene vinyl acetate copolymer having approximately 40-45% vinyl acetate content,
   0.06% antioxidant
   0.06% U.V. light stabilizer, and
   0.1% bactericide.

10. A solvent-based, clear caulking composition comprising by weight approximately:
    100 parts of a first ethylene vinyl acetate copolymer having a 45-55% vinyl acetate content,
    2.5-25 parts of a second ethylene vinyl acetate copolymer having approximately a 20-45% vinyl acetate content,
    35-65 parts water white hydrocarbon resin,
    17-25 parts thickening agent,
    0-10.0 parts plasticizer,
    0-10.0 parts bactericide,
    0-0.20 parts antioxidant/U.V. light stabilizer, and
    200-250 parts solvent.

11. The solvent-based, clear caulking composition of claim 10 wherein said first ethylene vinyl acetate copolymer having a 45-55% vinyl acetate content has a 51% vinyl acetate content.

12. The solvent-based, clear caulking composition of claim 11 wherein said solvent is a blend of approximately 139 parts chlorinated hydrocarbon, 54 parts mineral spirits, and 36 parts toluol.

13. The solvent-based, clear caulking composition of claim 11 wherein said water white hydrocarbon resin is present in the range of 50-55 parts.

14. The solvent-based, clear caulking composition of claim 11 wherein said second ethylene vinyl acetate copolymer having approximately a 20-45% vinyl acetate content has a vinyl acetate content of approximately 20% and is present in the amount of approximately 5 parts.

15. The solvent-based, clear caulking composition of claim 11 wherein said second ethylene vinyl acetate copolymer having approximately a 20-45% vinyl acetate content has a vinyl acetate content of approximately 40-45% and is present in the amount of approximately 25 parts.

16. The solvent-based, clear caulking composition of claim 11 wherein said antioxidant is a polyphenol presen in the amount of approximately 0.25 parts and said U.V. light stabilizer is a benzotriazole present in the amount of approximately 0.25 parts.

17. The solvent-based, clear caulking composition of claim 11 wherein said thickening agent is a combination of a fumed silica which has a refractive index compatible with the other ingredients so as to maintain the clarity of said caulking composition, and a glycol which couples with said fumed silica to provide a good gel structure.

18. The solvent-based, clear caulking composition of claim 11 wherein said plasticizer is a benzoic acid derivative present in the amount of approximately 7 parts.

19. The solvent-based, clear caulking composition of claim 11 wherein said bactericide is a clear antimicrobial agent compatible with said plasticizer.

20. A solvent-based, clear caulking composition consisting essentially of approximately:
    100 parts of a first ethylene vinyl acetate copolymer having a 51% vinyl acetate content,
    4.75 parts of a second ethylene vinyl acetate copolymer having approximately a 20% vinyl acetate content,
    52 parts water white hydrocarbon resin,
    0.25 parts polyphenol antioxidant
    0.25 parts benzotrizole U.V. light stabilizer,
    21 parts fumed silica/glycol mixture as a thickening agent,
    0.5 parts clear antimicrobial agent,
    7 parts benzoic acid derivative plasticizer, and
    230 parts solvent blend of chlorinated hydrocarbons, mineral spirits, and toluol.

* * * * *